(12) United States Patent
Lahner et al.

(10) Patent No.: US 7,895,546 B2
(45) Date of Patent: Feb. 22, 2011

(54) STATISTICAL DESIGN CLOSURE

(75) Inventors: Juergen K. Lahner, Morgan Hill, CA (US); Balamurugan Balasubramanian, Santa Clara, CA (US); Kavitha Chaturvedula, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 480 days.

(21) Appl. No.: 11/849,391

(22) Filed: Sep. 4, 2007

(65) Prior Publication Data

US 2009/0063564 A1    Mar. 5, 2009

(51) Int. Cl.
*G06F 17/50*    (2006.01)
(52) U.S. Cl. .............................. 716/18; 716/2; 716/19
(58) Field of Classification Search ................. 716/2, 716/18, 19
See application file for complete search history.

(56) References Cited

U.S. PATENT DOCUMENTS

| 7,487,474 B2 * | 2/2009 | Ciplickas et al. ............... 716/2 |
| 2008/0162103 A1 * | 7/2008 | White et al. .................. 703/13 |

* cited by examiner

*Primary Examiner*—Thuan Do
(74) *Attorney, Agent, or Firm*—Christopher P. Maiorana, PC

(57) ABSTRACT

A method of statistical design closure is disclosed. The method generally includes the steps of (A) reading statistical data from a database, the statistical data defining a plurality of chip yield improvements, one of the chip yield improvements in each one of a plurality of design closure categories respectively, the chip yield improvements capturing historically trends based on a plurality of previous projects, (B) calculating a plurality of targets of a current design closure project based on the statistical data, one of the targets in each one of the design closure categories respectively and (C) generating a resource report to a user that indicates a plurality of resources expected to be used the current design closure project.

20 Claims, 5 Drawing Sheets

TABLE I

| Feature Type | Feature Subtype | Meeting Static Power Consumption Goals | Meeting Dynamic Power Consumption Goals | Meeting Net Timing Goals | Meeting Slack Goals | Turn Around Time Goals | Headcount Goals |
|---|---|---|---|---|---|---|---|
| Arithmetic. Structures | Adders | S: 0.001%<br>FP: 0.0001%<br>PL: 0.1%<br>RT: 0.001%<br>O: 0% | S: 0.001%<br>FP: 0.0001%<br>PL: 0.1%<br>RT: 0.001%<br>O: 0% | S: 0.001%<br>FP: 0.0001%<br>PL: 0.1%<br>RT: 0.001%<br>O: 0% | S: 0.001%<br>FP: 0.0001%<br>PL: 0.01%<br>RT: 0.001%<br>O: 0% | S: 0.001%<br>FP: 0.0001%<br>PL: 0.1%<br>RT: 0.01%<br>O: 0% | S: 0.00001%<br>FP: 0.0001%<br>PL: 0.01%<br>RT: 0.0001%<br>O: 0% |
|  | Dividers |  |  |  |  |  |  |
|  | ........ |  |  |  |  |  |  |
| Random Logic | Typical x |  |  |  |  |  |  |
|  | Typical y |  |  |  |  |  |  |
| Control Logic | Typical x |  |  |  |  |  |  |
| Data path |  |  |  |  |  |  |  |
| Busses |  |  |  |  |  |  |  |
| Multiplex Structures |  |  |  |  |  |  |  |
| FIFOS |  |  |  |  |  |  |  |
| FFS |  |  |  |  |  |  |  |
| Memories |  |  |  |  |  |  |  |

TABLE I

| Feature Type | Feature Subtype | Meeting Static Power Consumption Goals | Meeting Dynamic Power Consumption Goals | Meeting Net Timing Goals | Meeting Slack Goals | Turn Around Time Goals | Headcount Goals |
|---|---|---|---|---|---|---|---|
| Arithmetic Structures | Adders | S: 0.001%<br>FP: 0.0001%<br>PL: 0.1%<br>RT: 0.001%<br>O: 0% | S: 0.001%<br>FP: 0.0001%<br>PL: 0.1%<br>RT: 0.001%<br>O: 0% | S: 0.001%<br>FP: 0.0001%<br>PL: 0.1%<br>RT: 0.001%<br>O: 0% | S: 0.001%<br>FP: 0.0001%<br>PL: 0.01%<br>RT: 0.001%<br>O: 0% | S: 0.001%<br>FP: 0.0001%<br>PL: 0.1%<br>RT: 0.01%<br>O: 0% | S: 0.00001%<br>FP: 0.0001%<br>PL: 0.01%<br>RT: 0.0001%<br>O: 0% |
|  | Dividers |  |  |  |  |  |  |
|  | ........ |  |  |  |  |  |  |
| Random Logic | Typical x |  |  |  |  |  |  |
| Control Logic | Typical y<br>Typical x |  |  |  |  |  |  |
| Data path |  |  |  |  |  |  |  |  |
| Busses |  |  |  |  |  |  |  |  |
| Multiplex Structures |  |  |  |  |  |  |  |  |
| FIFOS |  |  |  |  |  |  |  |  |
| FFS |  |  |  |  |  |  |  |  |
| Memories |  |  |  |  |  |  |  |  |

FIG. 2

TABLE II

| Goals | Variables |
|---|---|
| Power | Static Power Consumption |
|  | Dynamic Power Consumption |
|  | Vt Distribution |
|  | On-Chip Variations |
|  |  |
| Timing | Net Timing |
|  | Slack · |
|  | Ramp-Up Time |
|  | On-Chip Variations |
|  |  |
| Routing | Congestion |
|  | On-Chip Variations |
|  |  |
| Other | Turn-Around-Time |
|  | Computer Power |
|  | Headcount |
|  |  |

FIG. 3

STATISTICAL DESIGN CLOSURE

FIELD OF THE INVENTION

The present invention relates to chip design techniques generally and, more particularly, to a statistical design closure.

BACKGROUND OF THE INVENTION

Design closure of current chip designs has become complex. The ability to estimate how long and how much resources will be consumed closing the design of a large circuit has become unpredictable in the early phase of the design closure. Design closure runs of the large circuits are taking a long time. Margins are being used to handle risks of not being able to close timing. Constraints are either being merged or used in multiple modes. Furthermore, the projects are not always staffed correctly. As a result, scheduling remains unpredictable and the circuits are often delivered late.

To account for the unpredictability, many projects add margins or over-constraining the design in early phases. Some projects use multiple runs and multiple loops to reach design closure. More licenses and machines have been used to permit parallel operations. Hiring more engineers sometimes helps achieve design closure in a reasonable amount of time. Statistical static timing analysis is also used in the industry to verify the timing of a design, which might include the statistical handling of clock trees and ramp-up times.

Unfortunately, the existing solutions can have drawbacks. Adding the margins and/or over-constraining the designs are based on rules of thumb or past experience that is not always available. Having more engineers assigned to the projects does not always result in a faster turn around time. Furthermore, conducting several design closure runs on the same chip in parallel using several machines is inefficient. Therefore, a resource efficient method is desired for design closure projects.

SUMMARY OF THE INVENTION

The present invention concerns a method of statistical design closure. The method generally comprises the steps of (A) reading statistical data from a database, the statistical data defining a plurality of chip yield improvements, one of the chip yield improvements in each one of a plurality of design closure categories respectively, the chip yield improvements capturing historically trends based on a plurality of previous projects, (B) calculating a plurality of targets of a current design closure project based on the statistical data, one of the targets in each one of the design closure categories respectively and (C) generating a resource report to a user that indicates a plurality of resources expected to be used the current design closure project.

The objects, features and advantages of the present invention include providing a statistical design closure that may (i) achieve an intended chip yield, (ii) optimize the use of resources, (iii) focus the work on important tasks, (iv) avoid spending resources on tasks that achieve little benefit, (v) minimize over-constraining the design in anticipation of unknowns, (vi) minimize the margins added to the design to account for the unknowns and/or (vii) produce fast turn-around-times.

BRIEF DESCRIPTION OF THE DRAWINGS

These and other objects, features and advantages of the present invention will be apparent from the following detailed description and the appended claims and drawings in which:

FIG. 2 is a block diagram of an example statistical data table;

FIG. 3 is a diagram of an example design closure table;

DETAILED DESCRIPTION OF THE PREFERRED EMBODIMENTS

Design closure generally contains a design process comprising steps of synthesis, floorplanning, placement, routing and other steps. A foundation of statistical design closure may be that many variables and variations of processes, design flows and methodologies may impact a final behavior of a chip. In common design closures, the goal of a single design closure step is either met or not. However, the individual design engineers and/or program managers do not know what impact each of the variables and variations actually has on the overall process.

Figure 1:
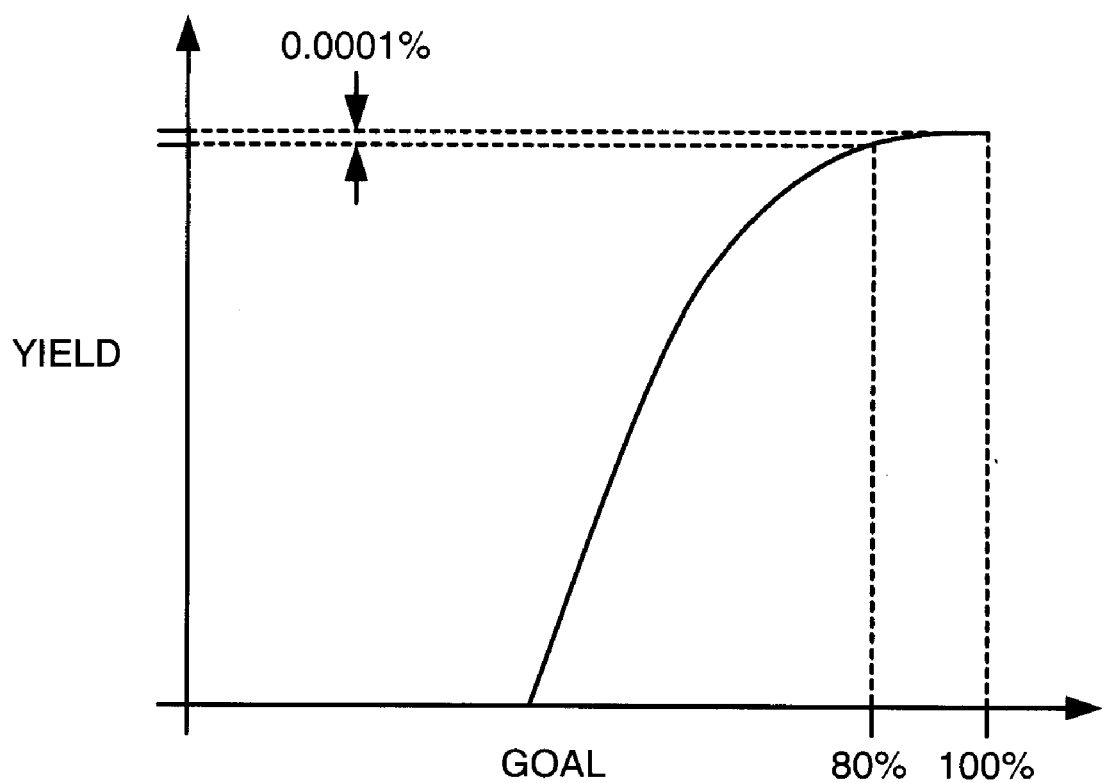
FIG. 1 is a diagram of an example yield graph.

Referring to FIG. 1, a diagram of an example yield graph is shown. The graph may express a statistical yield (e.g., probability) as a function of achieving a defined goal. In the example shown, a 20% less aggressive design closure in the timing (e.g., 80% of the goal) of a particular structure may only impact the final chip yield (e.g., working parts) by 0.0001%. Valuable resource might be focusing on the wrong part of design closure or could be available to work on other designs instead of focusing on the final 20% of the goal. Therefore, a confidence level/goal (e.g., a target) for each task of the project may be defined in a statistical design closure based on data of previous designs and/or past experience.

Under the statistical design closure technique, instead of trying to resolve actual goals (e.g., 100% design closure) for each design closure step, variables and goals in one or more parts of the design closure may be changed to statistical variables and statistical goals. For instance, an architecture selection for datapath/arithmetic components may be based on statistical data of a probability of easier design closure. Critical nets may be changed to statistical critical nets. Power consumption goals may be changed to statistical consumption power goals (or targets). Congestion values may be changed to statistical congestion values (or targets).

In addition to all of the process variables of the actual chip, the present invention generally accounts for how the turn-around-time, computational power and experience levels used in the various design closure steps impact the overall process. For example, if a headcount of 10 engineers, instead of a single engineer, working on a particular design closure step only leads to a 0.01% yield difference of the final chip, the valuable manpower resources may be used on different tasks that may have a greater impact on the final chip yield and/or on other projects.

The present invention generally covers all aspects of design closure starting from processes and technical data to data that includes staffing (e.g., headcount impacts on tasks) and turn-around-time information. As more historical data is collected in all of the areas, the more powerful the statistical design closure technique generally becomes.

In order to enable statistical design closure, data points may be collected for each design closure step (e.g., synthesis, floorplanning, placement, routing and the like) for the variables defined for common structures of a design. A goal of the data collection may be to show an overall impact on chip yield caused by each individual task of a typical structure in a circuit design. Carefully extraction of the data from old designs generally enables an accurate tracking of current designs. In cases where not all of the data points are available, values may be interpolated or extrapolated where appropriate. For every current and past designs, the data related to design closure may be captured in a database or table.

Referring to FIG. 2, a block diagram of an example statistical data table (e.g., TABLE I) is shown. For simplicity, only a couple of representative data sample points are shown in TABLE I. TABLE I generally comprises a first column listing feature types commonly found in circuit designs. An optional second column may divide one or more features into multiple subtypes, one subtype on each row. The rest of TABLE I may comprise multiple columns of goals. Each goal column generally contains statistical data relative to a particular aspect of design closure. The aspects may include, but are not limited to, meeting static power consumption goals, meeting dynamic power consumption goals, meeting net timing goals, meeting slack goals, meeting turn-around-time goals and meeting headcount goals. Other aspects of design closure projects may be included in the table to meet the criteria of a particular application.

Each row of TABLE I may contain statistical values that characterize the improvements in chip yield. The chip yield improvements may represent a percentage increase in a final chip yield caused by continuing a particular step of the design closure beyond a target level (e.g., 90% of a final goal, 80% of a final goal, etc.) to the 100% final goal. As such, TABLE I may include a third dimension having a unique plane (similar to the plane shown) for each of the target levels. In some embodiments, each point in TABLE I may be a function of the target, similar to the graph shown in FIG. 1. The steps of the statistical design closure may use the following abbreviations in TABLE I: S=Synthesis; FP=Floorplanning; PL=Placement; RT=Routing and O=Others.

By way of example, meeting the static power consumption goals (e.g., third column from the left) for adders in the synthesis step is generally read from TABLE I as a 0.001% improvement. The S:0.001% value generally means that achieving all goals in synthesis only impacts 0.001% of the final chip yield compared with the target goal (e.g., 80%). In comparison, reaching the 100% goal for placement (PL) may contribute a 0.1% improvement in the chip yield. As such, a statistical design closure focusing more on placement and less on synthesis may produce a better chip yield at a given level of effort and consumption of resources. In another example, the headcount (e.g., right-most column) used in the synthesis step of a statistical design closure might only impact the final chip yield by S:0.00000001%. The low yield increase generally indicates that only a minor impact may be achieved if the task is staffed with 10 people instead of a single person.

TABLE I may provide a general basis for the statistical design closure. Project planning and execution for each step in the statistical design closure flow may be impacted by the values recorded in TABLE I. For instance, while trying to close the timing of a certain net, some timing violations may be acceptable if the violations only impact the final chip yield insignificantly.

Data points within TABLE I may be determined by any one or more of several techniques. The final chip yield may be a function of manufacturing processes, the Register Transfer Level (RTL) code and the design closure techniques. The design closure may be a function of the design closure steps, including synthesis, floorplanning, placement and global routing.

In a first data gathering technique, all of the design closure goals and parameters may be held constant in all of the steps, except the synthesis step. One or more targets may then be defined for the synthesis step (e.g., the 100% goal, a 90% target, an 80% target and the like). Thereafter, different sets of databases and netlists may be generated based on the different targets, one set for each of the targets. Each set of databases and netlists may then be processed through the design closure flow leaving all other parameters and variables unchanged (or with minor variations). Each resulting product database may be taped out and a chip yield captured. The results of the chip yields may be analyzed to create the data points in the synthesis row of the respective feature type/subtype. For example, if a 0.001% impact on the chip yield is measured by varying the target settings for synthesis from 90% to 100% and a 0.002% impact is measured by varying the target setting for synthesis from 90% to 80%, the overall impact on synthesis may be estimated. The data points may thus allow a statistical approach to be used in the synthesis step to achieve a desired and acceptable chip yield, instead of trying to meet a 100% goal with whatever chip yield results therefrom.

A second data gathering technique may be based on previous tape-outs of various designs and designer experiences from data collected during the design implementations. A review of chip yields and log files of design closure steps from previous designs may be analyzed and the statistical chip yield improvements extracted. The log files generally provide an indication of one or a few factors than may have had a significant contribution to the final chip yield. For example, when a design was taped-out in a hurry to meet a certain deadline, some design closure violations may have been either ignored, or evaluated and assessed to determine the risk for the tape-out. Such information may be leveraged to estimate data points within a statistics database (e.g., TABLE I).

Referring to FIG. 3, a diagram of an example design closure table (e.g., TABLE II) is shown. TABLE II may represent design closure variables. TABLE II generally comprises a left column containing goals and a right column containing the variable that may impact the corresponding goals. By way of example, the power goals may be a function of a static power consumption, a dynamic power consumption, a threshold voltage (Vt) distribution and on-chip variations (OCV) that occur during fabrication. The timing goals may be a function of a net timing, slack, ramp-up time and on-chip variations, and so on. Other goals (beyond the examples illustrated) may be defined to meet the criteria of a particular application. Other variables (beyond the examples illustrated) may be used for the goals to meet the criteria of a particular application.

Figure 4:
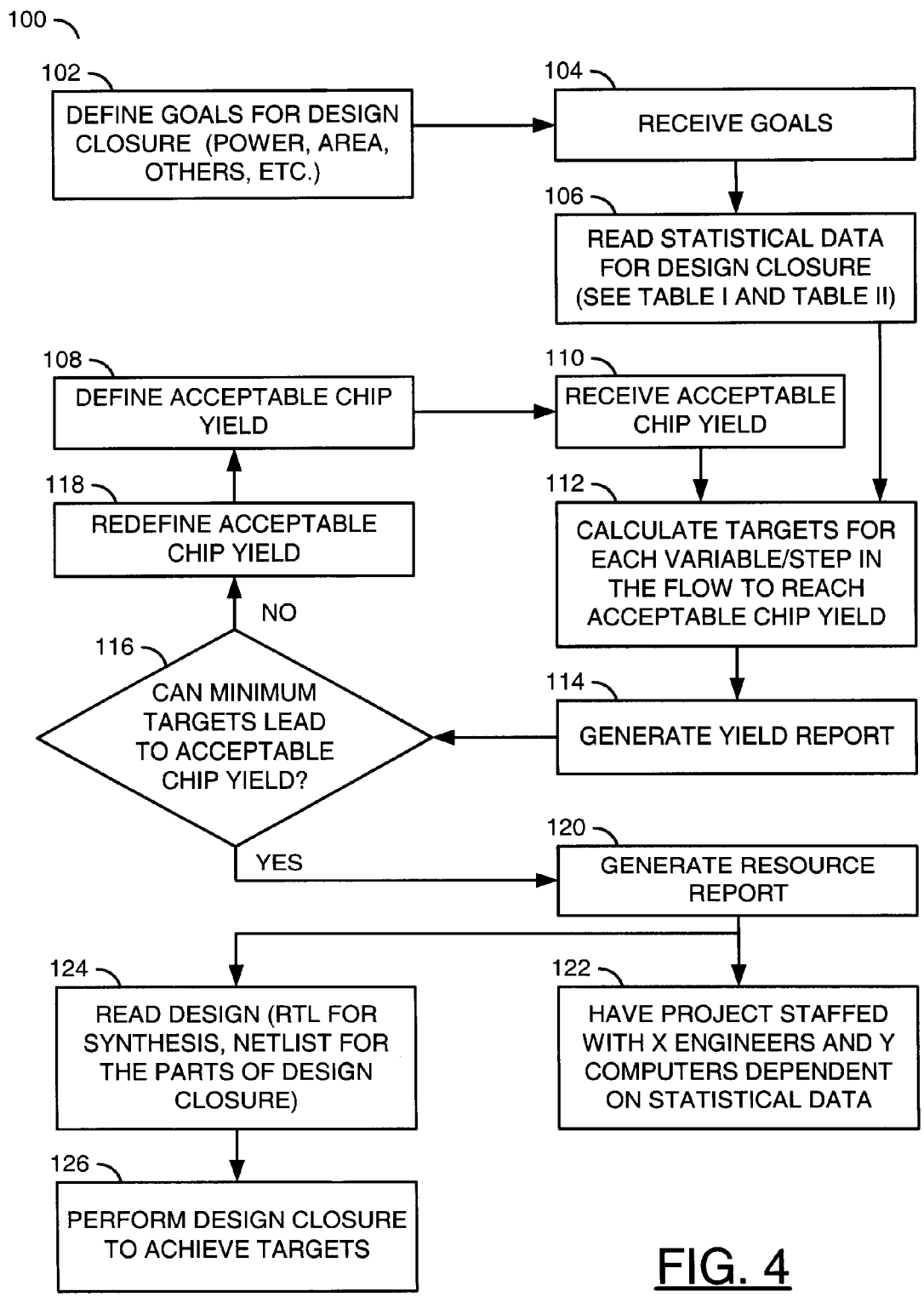
FIG. 4 is a flow diagram of an example method of statistical design closure in accordance with a preferred embodiment of the present invention.

Referring to FIG. 4, a flow diagram of an example method 100 of statistical design closure is shown in accordance with a preferred embodiment of the present invention. The method (or process) 100 may be implemented as one or more computer software programs interacting with one or more users. The method 100 generally comprises a step (or bock) 102, a step (or block) 104, a step (or block) 106, a step (or block) 108, a step (or block) 110, a step (or block) 112, a step (or block) 114, a step (or block) 116, a step (or block) 118, a step (or block) 120, a step (or block) 122, a step (or block) 124 and a step (of block) 126.

In the step 102, a user may define one or more goals for design closure. The goals may be in terms of power, area, congestion and the like. The software may receive the goals from the user in the step 104. Statistical data for a statistical design closure project may be read from a database (e.g., TABLE I and TABLE II) by the software in the step 106.

In the step 108, the user may define a chip yield that may be acceptable for the statistical design closure project. The acceptable chip yield may be received by the software in the step 110. In the step 112, the software may calculate one or more targets for each variable (e.g., net timing, slack, ramp-up time, etc.) in each step (e.g., synthesis, floorplanning, etc.) in each category (e.g., static power consumption, dynamic power consumption, net timing, etc.) of the project to reach the entered chip yield. For example, achieving an 80% target in net timing in the synthesis step may lead to an acceptable 99.9% chip yield.

The software may generate a yield report in the step 114 in a human readable format. The yield report may present the entered goals and calculated targets for each variable in each step in each category of the project. The estimated chip yield calculated from the statistical data based on the targets may also be included in the yield report.

If the targets are an unacceptable percentage of the original goals and/or the estimated chip yield is too low (e.g., the NO branch of step 116), the user may adjust the chip yield in the step 118. The software may receive the adjusted chip yield in the step 110, recalculate the targets in the step 112 and generate a new yield report in the step 114.

If the targets are acceptable and the estimated chip yield is acceptable (e.g., the YES branch of step 116), the software may generate and present a resource report in the step 120. The resource report may define the estimated resources that may be consumed by the statistical design closure project. The resource may include, but are not limited to, manpower, computers, time, budget and similar resources.

In the step 122, the calculated computer resources may be assembled and the calculated manpower for the project may be staffed. One or more design closure tools may be used in the step 124 to read the design from a design database. The design may be expressed in the form of a Register Transfer Level (RTL) file for use in the synthesis step, and a netlist file for use in the other steps of the project. The design closure may be performed by the tools in the step 126 using the targets (e.g., statistical goals) in place of the 100% goals to create the final layout of the chip. In many statistical design closure projects, all of the targets may be less than the 100% goals. In some statistical design closure projects, one or more of the targets may remain at the 100% goal levels.

Figure 5:
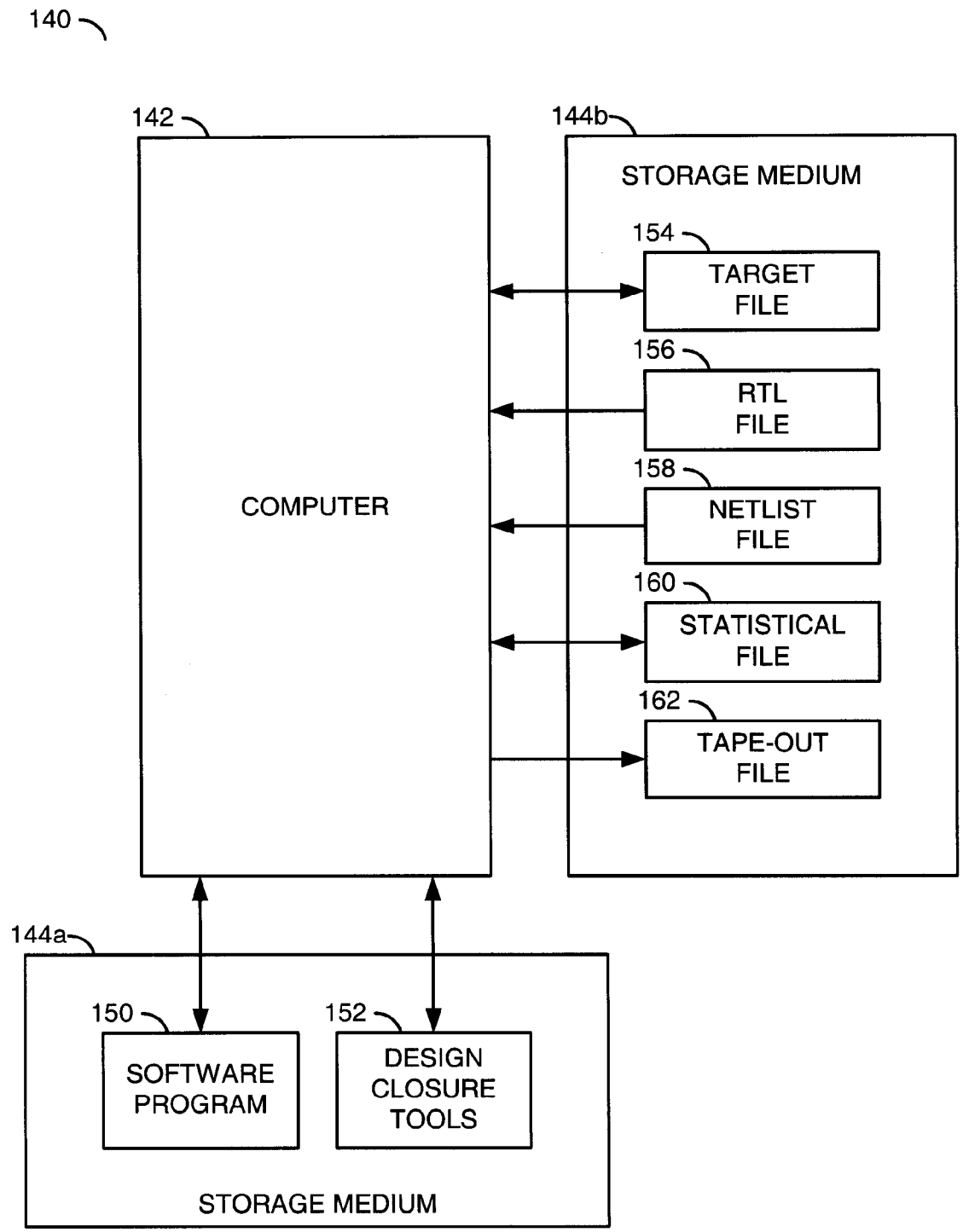
FIG. 5 is a block diagram of an example apparatus implementing the statistical design closure.

Referring to FIG. 5, a block diagram of an example apparatus 140 implementing the statistical design closure is shown. The apparatus 140 may be implemented as a computer 142 and one or more storage mediums 144*a*-144*b*. A storage medium 144*a* may store a software program 150 and one or more design closure tools 152. The software program 150 may define the steps of calculating the targets and reports (see FIG. 4). The design closure tools 152 may be operational to perform the synthesis, floorplanning, placement, routing and related layout tasks. The storage medium 144*b* may store a file 154, a file 156, a file 158, a file 160 and a file 162. The file 154 may contain the target goals calculated by the software program 150. The file 154 may contain the RTL code of the chip being created. The file 156 may contain a netlist of the chip being created. The file 160 may contain the statistical data (e.g., TABLE I and TABLE II) to be used by the software program 150 to determine the target goals. The file 162 may contain the final tape-out data for the chip.

The software program 150 and tool programs 152 may be read and executed by the computer 142. The computer 142 and programs 150-152 may access the data in the files 154-160 to perform the statistical design closure on the chip. The final layout of the chip may be written into the file 162.

The present invention may handle all variables of a design closure as statistical values (e.g., targets). Data collected from previous designs and current designs may be used to determine values for each of the targets based on an intended chip yield. Statistical data of actual chip yields from one or more foundries may be used to populate and update the statistical database.

The statistical design closure technique may provide an efficient usage of resources during a design closure project. Engineers may make efficient use of time by either focusing on high-yield tasks of the design closure project or working on other projects. The tools used in the statistical design closure may be used to accomplish less than the 100% goals, as had been done in the past. Instead, the tools may be used to achieve acceptable targets that impact the defined confidence level and the final chip yield in an optimal manner. Therefore, the statistical design closure technique may reduce or eliminate the practice of over-constraining designs to account for unknowns. The present invention may be used for any chip design such as Application Specific Integrated Circuits (ASIC), Field Programmable Gate Arrays (FPGA), Standard Product and the like.

The statistical design closure technique may result in an overall lower cost of bringing a chip to market. For example, consider a common design closure approach that tried to meet 100% goals for each step or at least some of the steps. The common design closures approach can be expensive (e.g., $300,000) to achieve a high passing chip yield (e.g., 99.9%). Accounting for additional related costs (e.g., $700,000), the project cost are driven up to $1,000,000. Adjusted for the actual chip yield, the effective total cost may be $1,001,000=$1,000,000×1/99.9%

With a statistical design closure, the targets are only a certain percentage (e.g., usually <100%) of the goals and the acceptable chip yield may be relaxed (e.g., 99.0%). The targets may be statistically calculated for each step (e.g., 80% for synthesis). Since the targets are easier to achieve than the 100% goals, the steps may be performed quicker by fewer people and/or with fewer resources. As such, the statistical design closure costs may be lower (e.g., $150,000) than the common costs. Adding in the other costs (e.g., $700,000) results in a reduced combined cost of $850,000. Adjusted for the relaxed yield, the effective total cost may be $858,858=$850,000×1/99.0%. Therefore, use of the statistical design closure approach may realize a cost savings of 14%=100×($1,001,000−$858,858)/$1,001,000.

The function performed by the diagrams of FIGS. 1-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMS, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of statistical design closure, comprising the steps of:
   (A) reading statistical data from a database, said statistical data defining a plurality of chip yield improvements, one of said chip yield improvements in each one of a plurality of design closure categories respectively;
   (B) generating a plurality of targets of a current design closure project suitable to achieve an expected chip yield, said generating of said targets is based on said statistical data and is performed by a computer, one of said targets is defined in each one of said design closure categories respectively, said targets comprising respective percentages of a plurality of goals of said current design closure project to be finished; and
   (C) generating a resource report to a user that indicates a plurality of resources expected to be used by said current design closure project.

2. The method according to claim 1, further comprising the step of:
   receiving said goals of said current design closure project from said user, wherein at least one of said goals is defined in each of said design closure categories.

3. The method according to claim 1, wherein said targets in each of at least two of said design closure categories comprise less than 100 percent of said goals in said at least two design closure categories.

4. The method according to claim 1, wherein said goals comprise (i) a power consumption goal, (ii) a timing goal, (iii) a routing goal, (iv) an area goal, (v) a headcount goal and (vi) a turn-around-time goal.

5. The method according to claim 1, further comprising the step of:
   receiving said expected chip yield from said user.

6. The method according to claim 1, further comprising the step of:
   generating a yield report to said user indicating if said targets will meet said expected chip yield.

7. The method according to claim 6, further comprising the step of:
   receiving an adjustment to said expected chip yield from said user in response to said yield report indicating that said targets will not meet said expected chip yield.

8. The method according to claim 1, further comprising the step of:
   performing said current design closure project, wherein each of said design closure categories is finished upon achieving said targets respectively.

9. The method according to claim 1, wherein said design closure categories comprise (i) synthesis, (ii) placement, (iii) routing, (iv) timing, (v) power, (vi) area, (vii) headcount and (viii) turn-around-time.

10. The method according to claim 1, further comprising a storage medium recording a computer program comprising the steps of claim 1.

11. A method of statistical design closure, comprising the steps of:
    (A) reading statistical data from a database, said statistical data defining a plurality of chip yield improvements, one of said chip yield improvements in each one of a plurality of design closure categories respectively;
    (B) receiving an expected chip yield from a user;
    (C) generating a plurality of targets of a current design closure project suitable to achieve said expected chip yield, said generating of said targets is based on said statistical data and is performed by a computer, one of said targets is defined in each one of said design closure categories respectively, said targets comprising respective percentages of a plurality of goals of said current design closure project to be finished; and
    (D) generating a yield report to said user indicating if said targets will meet said expected chip yield.

12. The method according to claim 11, further comprising the step of:
    receiving said goals of said current design closure project from said user, wherein at least one of said goals is defined in each of said design closure categories.

13. The method according to claim 11, wherein said targets in each of at least two of said design closure categories comprise less than 100 percent of said goals in said at least two design closure categories.

14. The method according to claim 11, wherein said goals comprise (i) a power consumption goal, (ii) a timing goal, (iii) a routing goal, (iv) an area goal, (v) a headcount goal and (vi) a turn-around-time goal.

15. The method according to claim 11, further comprising the step of:
    receiving an adjustment to said expected chip yield from said user in response to said yield report indicating that said targets will not meet said expected chip yield.

16. The method according to claim 11, further comprising the step of:
    generating a resource report to said user that indicates a plurality of resources expected to be used by said current design closure project.

17. The method according to claim 16, wherein said resources comprise staffing of said current design closure project.

18. The method according to claim 11, further comprising the step of:
    performing said current design closure project, wherein each of said design closure categories is finished upon achieving said targets associated with said design closure categories respectively.

19. The method according to claim 11, wherein said design closure categories comprise (i) synthesis, (ii) placement, (iii) routing, (iv) timing, (v) power, (vi) area, (vii) headcount and (viii) turn-around-time.

20. The method according to claim 11, further comprising a storage medium recording a computer program comprising the steps of claim 11.

* * * * *